United States Patent [19]

Hiestand

[11] 4,094,522
[45] June 13, 1978

[54] CHUCK HAVING RADIALLY RECIPROCATING JAWS

[75] Inventor: Karl Hiestand, Pfullendorf, Germany

[73] Assignee: Firma SMW-Spanneinrichtungen Schneider & Weisshaupt, Germany

[21] Appl. No.: 749,694

[22] Filed: Dec. 13, 1976

[30] Foreign Application Priority Data

Dec. 13, 1975 Germany .................. 2556227

[51] Int. Cl.² .................................. B23B 31/16
[52] U.S. Cl. .......................... 279/4; 279/114; 279/121
[58] Field of Search ............... 279/121, 110, 4, 114

[56] References Cited

U.S. PATENT DOCUMENTS

| 2,602,673 | 7/1952 | Deuring et al. | 279/121 X |
| 3,698,729 | 10/1972 | Scharfen et al. | 279/4 |
| 3,704,022 | 11/1972 | Blattry et al. | 279/121 |
| 3,771,804 | 11/1973 | Platt | 279/121 |
| 3,814,448 | 6/1974 | Buck | 279/4 X |
| 4,007,943 | 2/1977 | Scharfen et al. | 279/121 |

FOREIGN PATENT DOCUMENTS 435,920 10/1967 Switzerland ................ 279/110

*Primary Examiner*—Gil Weidenfeld
*Attorney, Agent, or Firm*—McGlew and Tuttle

[57] ABSTRACT

The chuck is for use with turning machines, and includes a chuck body and radially displaceable jaws each movable by a key bar which is guided in the chuck body tangential to the axis of turning, with each key bar having a splined strip meshing with teeth on the associated jaw and being displaceable to an extent such that, for removing the associated jaw, the splined strip attains a position in which it is disengaged from the teeth of the associated jaw. The actuating mechanism comprises a control member, in the form of a cylindrical sleeve, concentrically guided in the chuck body and axially displaceable in the latter through a key bar operating range and into end positions beyond the operating range. The control member may be formed with wedge surfaces extending obliquely to the direction of displacement of the key bars and each key bar is formed with a corresponding mating surface. Thereby, responsive to axial displacement of the control member in the chuck body, the key bars are displaced to displace the chuck jaws radially of the chuck body. Alternatively, the control member rotatably carries antifriction bearings engageable with both the wedge surfaces of the control member and surfaces of a slot in the chuck body. In a third embodiment of the invention, gears are rotatably mounted in respective recesses of the chuck body and each gear has teeth meshing with teeth on the control member and teeth meshing with teeth on the associated key bar. The control member is displaceable by a fluid pressure operated linear actuator mounted on the machine spindle and controlled by a solenoid valve. The piston of the actuator carries a cam engageable with a limit switch at the end of the operating stroke of the control member, and the limit switch may be bypassed by a manually operable switch to move the control member into one of its end positions. Alternatively, the linear actuator may be incorporated directly in the chuck body.

28 Claims, 11 Drawing Figures

CHUCK HAVING RADIALLY RECIPROCATING JAWS

FIELD AND BACKGROUND OF THE INVENTION

The present invention relates to a chuck for turning machines, comprising radially displaceable master or clamping jaws each movable by means of a respective key bar which is guided in the chuck body tangentially to the axis of turning, with the key bars being provided with splined strips by which they engage teeth of the associated jaws and being displaceable to an extent such that, for removing the jaws, the splined strips come into a position in which they are disengaged from the teeth of the jaws. The invention further relates to a purposeful and advantageous development of the design of such a key bar chuck.

DESCRIPTION OF THE PRIOR ART

A power operated chucking equipment, for turning machines, is already known from German Pat. No. 2,007,509, and the corresponding U.S. Pat. No. 3,698,729 and it comprises a chuck, with jaws which are movable by means of key bars which are guided in the chuck body tangentially to the turning axis, and a cooperating pressure-fluid operated cylinder secured to the end of the spindle. The drive member of the chuck in this design is a gear which is connected, by a rotary tube extending through the hollow spindle, to the rotary piston of a rotary-piston type actuator. When pressure is applied to the piston, the piston turns the gear which is firmly connected thereto and meshes with teeth provided on the inside of the key bars, so that the bars are displaced.

It is true that this chucking device makes it possible to utilize the advantage of a key bar chuck, namely, the rapid exchange of the clamping jaws, because, by means of a particular control mechanism, the piston can be brought into an end position in which the splined strips of the key bars are disengaged from the teeth of the jaws. However, the expenses of construction and manufacture of the rotary-piston actuator which, in particular, is provided with three pressure chambers, are extremely high. This chucking device cannot be manufactured economically.

Further, high leakage losses in the three circular-segment-shaped pressure chambers of the rotary-piston actuator and, thereby, considerable pressure drops which are caused by the great number of gaps to be sealed and by the specific design of the adjacent parts must be taken into account. A reliable sealing cannot be obtained and a pressure reservoir along with a check valve, as required by the authorities for reasons of safety, cannot be used with this device because the pressure level in the rotary-piston actuator cannot be maintained. Additionally, during the starting and braking period of the spindle, the rotary piston is exposed to suddenly occurring torques. In extreme instances, this may lead to the opening or closing of the chuck. In addition, a drive safety is needed for the rotary-piston actuator and the chuck at the intermediate flange and if a direct drive of the chuck is provided, in order to ensure the absorption of high torques during operation.

The main disadvantage of this known chucking device is that it cannot be used universally. That is, a chucking cylinder equipped with a rotary piston actuator cannot be used for chucking tools which are actuable through an axially displaceable actuating member and of which large numbers are available in every plant, but can never be operated except together with the respective chuck. Therefore, the re-equipment of a numerically controlled machine on which such a chucking device is mounted is very time consuming, and frequently, the use of a chuck of another type is even impossible because the rotary-piston actuator is firmly mounted on the machine spindle.

A further disadvantageous feature of this design is that the forces acting on a key bar must be transmitted through s single tooth of the gear, and that, due to the rotary motion of the rotary tube and the gear firmly connected thereto, dirt and, in particular, turnings, which may pass through the gearing to the gear, are rolled in. This not only requires a frequent dismounting of the chuck for cleaning purposes but also frequently leads to damages or to an impairment of the rotational accuracy of the jaws which, in turn, results in stresses and a nonuniform load distribution in the internal parts of the chuck.

SUMMARY OF THE INVENTION

For these reasons, the present invention is directed to a chuck of the above mentioned kind, comprising key bars extending transversely to the chuck axis and acting on the jaws, in which the clamping jaws are disengaged from the key bars, but which has none of the disadvantages discussed in the foregoing description of the prior art. Rather, the objective of the present invention is to provide key bars which are actuable by an axial motion which can be produced by an axially operating chucking cylinder, preferably equipped with a pressure-fluid operated piston, so that, with a small axial length of the chuck, high clamping forces and a high centering accuracy are obtained. It should further be made possible to considerably gear up the applied forces and adjusting paths, while ensuring low constructional and manufacturing expenses and a high efficiency. Quite particularly, the chucking cylinder is to be usable universally, in order to obtain short machine re-equipment periods if an exchange of the chucking tools is needed.

In accordance with the invention, a control member is provided for moving the key bars in a key bar chuck, which is concentrically guided in the chuck body and axially displaceable into a front or rear end postion beyond the operational zone, and which is provided with plane or curved wedge surfaces extending in the direction of the key bars, obliquely to the direction of displacement thereof, or with splined strips or teeth, or with an actuating member, and each key bar is provided with a corresponding mating surface, or teeth, or an actuating member which, respectively, applies against the wedge or slant surface, or engages, directly or through an intermediate member, the splined strips or teeth of the control member.

With this design, it is very advantageous to provide the control member with extensions projecting outwardly and extending tangentially to a base circle, and which are provided, on their outside, with a wedge or slant surface or teeth cooperating with one of the key bars. In another embodiment, the control member may be provided with straight or helical teeth engaging a gear, as an intermediate member, which is rotatably mounted in a recess of the chuck body and, in turn, meshes with the splined portion of the respective key bar.

In order to guide the control member non-rotatably, its rotation is advantageously prevented by means of extensions, preferably, the extensions provided with wedge surfaces, which engage recesses of the chuck body. The forces produced by the power transmission are thus absorbed directly by the chuck body. p For reasons of construction, it is advantageous to provide each key bar with a slot extending obliquely in the longitudinal direction of the bar and in which one or both of the side walls are formed as slant or wedge surfaces which cooperate with the extensions of the control member. The design may be such that these slots are provided with slant or wedge surfaces having two different inclinations in the longitudinal direction of the slot, of which one is intended for the clamping stroke and the other for a rapid stroke, and the extensions of the control member are provided with two corresponding surfaces cooperating therewith.

The control member may be designed as a sleeve, connected through a tie rod, to the actuating member of a servo device, in particular, to a pressure-fluid operated piston. It is also possible, however, in order to obtain a structural unit of the kind of a collet chuck, to connect the control member directly to an actuating member in the form of a pressure-fluid operated piston, which is mounted for reciprocation in the chuck body in which the key bars are guided.

For an automatic limitation of the operational zone of the control member, the control member or the actuating member may be associated, in a simple manner, with a limit switch. If it is desired to displace the control member into its end position, for example, for changing the jaws, the switch is bridged.

In order to prevent dirt from penetrating into the gearing, it is further advisable to provide the key bars with seals at the sides of the splined strips. It is useful to design the seals of the key bars as sealing strips which extend parallel to the guide slots of the jaws and may be screwed or cemented to the bars or inserted in slots worked therein. One of the seals of each key is provided immediately adjacent the splined strip and the other adjacent the recess.

To reduce friction, the guide surfaces of the key bars and/or the respective cooperating contact surfaces of the chuck body may be provided with a slide lining, for example, a molybdenum lining. It is also possible, however, to provide linear ball or roller bearings between the guide surfaces of the key bars and the contact surfaces of the chuck body.

For the same purpose, the slant or wedge surfaces or the teeth of the control member and/or the contact surfaces of the key bars cooperating therewith may be provided with a slide lining, for example, a molybdenum lining, or a linear ball or roller bearing may be provided between these surfaces. It is further advisable to provide the contact surface of the control member in the chuck body and/or the corresponding contact surface in the chuck body with a slide lining or to provide a linear ball or roller bearing therebetween.

An antifriction bearing may also be provided on each extension of the control member, for cooperation with the slant or wedge surfaces of the key bars, in which case, the bearings may be mounted on the extensions in a manner such that they bear partly against the slant surfaces of the key bars and partly against the corresponding contact surfaces of the chuck body recesses associated with the control member. Inversely, antifriction bearings may also be mounted in the key bars and cooperate with the slant or wedge surfaces provided on the extensions of the control member.

The lead or pitch of the splined strips of the key bars is preferably chosen so that straight teeth perpendicular to the extension of the jaws can be provided. This is very advantageous in the manufacture, because then the jaws of the chuck can be fabricated in blocks.

Further, in order to retain the jaws in position and align them prior to their engagement with the splined strips of the key bars, a retaining member may be provided in each of the key bars, in the tooth-free zone thereof following the splined strip.

The retaining member advantageously comprises an engaging pin which is non-rotatably guided and has beveled surfaces engaging the teeth of the jaws, a slide piece resting against the chuck body, and a compression spring inserted therebetween. It is further advisable to associate the slide piece with a recess in the chuck body extending in the axial direction of the retaining member, and to provide the recess with an oblique surface and the slide piece with a mating wedge surface, which surfaces cooperate with each other during the latching of the jaws. If the distance between the engaging pin and the slide piece is dimensioned so that, in the latched position of the jaws, these parts abut on each other, it is ensured that, particularly when heavy jaws are used, the force of the springs cannot be overcome and the jaws are securely arrested by the retaining member.

The chuck designed in accordance with the invention is not only inexpensive in construction and manufacture as compared to the devices of the prior art, but also offers primarily the advantageous possibility, due to a double transmission of the applied power, of gearing up this power and also each controlled motion. That is, if an axially displaceable control member is used for moving the key bars, and which is provided with slant surfaces or with teeth cooperating with the key bars, it is possible to transmit the force acting on a single key bar through two couples of cooperating wedge surfaces or teeth, namely, from the control member through wedge surfaces to the key bars and therefrom through the splined strips to the jaws. This makes it easily possible to increase the applied force, and also the clamping motion of the jaws may be substantially increased or reduced, so that any requirements of the operation can be easily met.

A further advantage is that the forces are transmitted not by rolling motions but by sliding motions. Therefore, no problem arises with the large dimensioning of the component parts participating in the power transmission or of their cross-sections, so that small surface pressures can be provided and also extremely high forces, which are absorbed by the chuck body, may be transmitted.

Consequently, the actuating device of the chuck designed in accordance with the invention may comprise a conventional chucking cylinder, the piston of which is connected to the axially displaceable control member. Then, the proved transversely moving key bars are actuated by means of axially directed thrust and pull forces. There are no sealing problems with conventional pressure cylinders. Primarily, a universal applicability of the device is ensured, particularly on numerically controlled machines, since not only a rapid re-equipment of the chuck, i.e., exchanging of the jaws, is made possible, but also the key bar chuck itself can be exchanged in a very short time for a finger chuck, collet chuck, or the like, with the chucking cylinder again used as the servo device. Thus, the inventive chuck makes it possible to considerably reduce the setting time of a machine.

The deviation of the axially directed forces, as well as of the axial motion of the control member, is effected by two mutually different component parts, namely, through the slant surfaces of the control member and the splined strips of the key bars, and the clamping forces may even be stepped by an unequal slope of the slant surfaces provided on the key bars, so as to produce a slower clamping stroke and a rapid disengagement stroke. This manner of force transmission leads to an overall short length and prevents dirt accumulation in the chuck. Thus, the novel concept of the chuck in accordance with the invention not only offers the advantages of a key bar chuck, but also makes it possible to use a conventional chucking cylinder, having an axially movable working member, for actuating the chuck.

An object of the invention is to provide an improved key bar actuating mechanism for a key bar chuck.

Another object of the invention is to provide such a chuck in which the key bars are actuated responsive to an axial motion produced by an operating chucking cylinder.

A further object of the invention is to provide such a chuck in which the applied forces and the adjusting paths can be considerably geared up.

Yet another object of the invention is to provide such a chuck involving low construction and manufacturing expenses and having a high efficiency.

A further object of the invention is to provide such a chuck which is usable universally in order to obtain short machine re-equipment periods when an exchange of chucking tools is needed.

For an understanding of the principles of the invention, reference is made to the following description of typical embodiments thereof as illustrated in the accompanying drawings.

DESCRIPTION OF THE PREFERRED EMBODIMENTS

Figure 1:
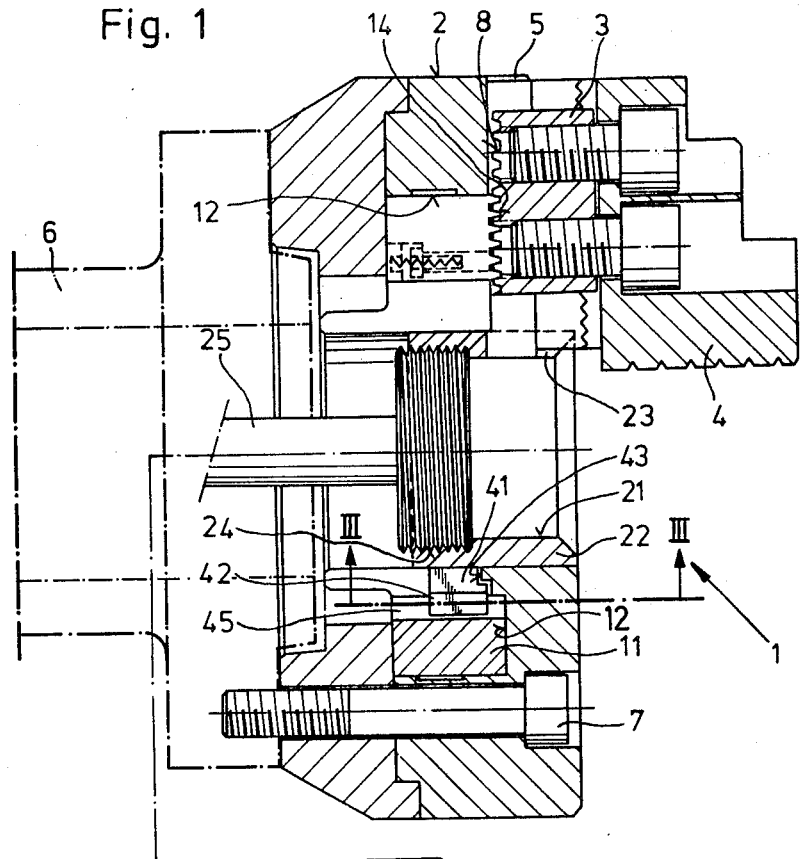
FIG. 1 is a substantially diametrical sectional view of a chuck embodying the invention and provided with a servo equipment.
Figure 1:
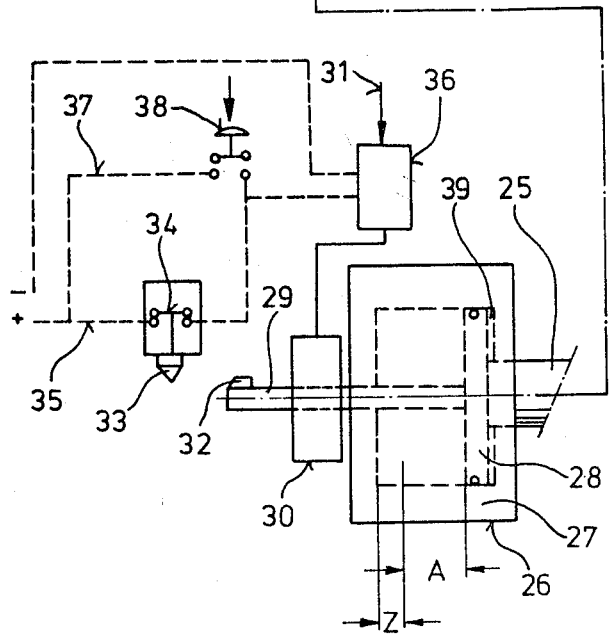
Figure 2:
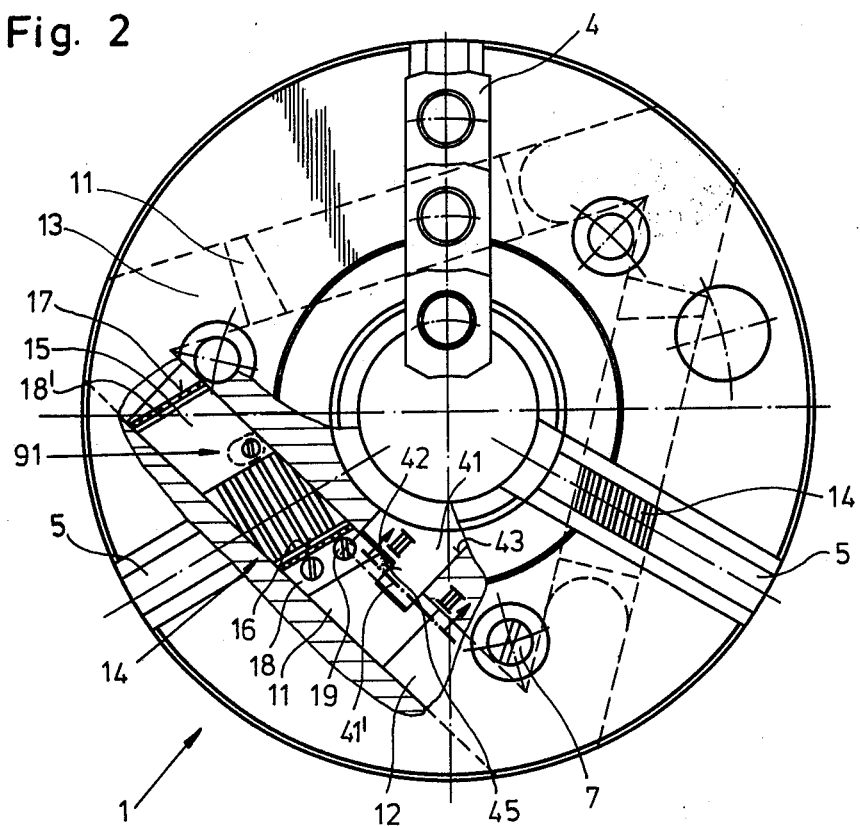
FIG. 2 is a front elevation view of the chuck shown in FIG. 1, partly in section.
Figure 3:
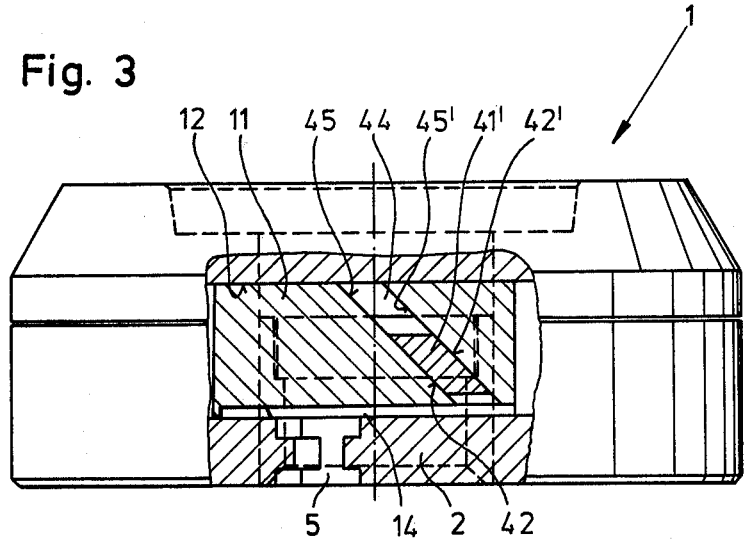
FIG. 3 is a top plan view of the chuck shown in FIGS. 1 and 2, partly in section along the lines III—III of FIGS. 1 and 2.

Referring to FIGS. 1, 2 and 3, a chuck shown therein, generally designated 1, comprises a chuck body 2 which includes a receiving part in which master jaws 3, provided with teeth 8, are inserted in radially extending, T-shaped slots 5. Clamping jaws 4, acting on the workpiece (not shown), are secured to master jaws 3. Chuck 1 is mounted on a machine spindle by means of screws 7 extending through the chuck body, or in another direct manner.

To displace master jaws 3 radially, three key bars 11 are provided which are inserted into slots 12 extending tangentially to the turning axis of the machine. At each of their ends, slots 12 are closed by means of end pieces 13. On their front sides, key bars 11 are provided with splined strips 14 which engage the teeth 8 of master jaws 3. In addition, tooth-free recesses 15, adjacent to splined strips 14, are provided in each key bar 11, in order to permit removal of master jaws 3 from splined strips 14 as soon as their teeth 8 are disengaged.

The penetration of dirt, particularly turnings, is prevented by seals 16 and 17 which are provided adjacent splined strips 14 and 15 and extend parallel to slots 5. Seals 16 and 17 comprise sealing strips 18 and 18' which are secured by means of screws 19 or are cemented in place or inserted in slots.

For actuating key bars 11, which extend transversely to the turning axis, an axially displaceable control member 21 is provided, which is connected to a servo device 26 comprising a piston 28 which is received in a clamping cylinder 27 and actuated by means of a pressurized fluid. For this purpose, control member 21, which is provided with slots 23 permitting displacing of master jaws 3 or clamping jaws 4 up to the center, is designed as a sleeve 22 and provided with a thread 24 into which a tie rod 25 firmly connected to piston 28 and extending through the machine spindle is screwed. With this design, chuck 1 can easily be separated from servo device 26. An axial displacement of piston 28 causes a corresponding displacement of control member 21.

Control member 21 is further provided with extensions 41 which extend tangentially to a base circle and each of which is associated with a respective one of key bars 11. For receiving extensions 41, chuck body 2 is provided with corresponding recesses 43. On the outer portion 41' of extensions 41, as shown particularly in FIG. 3, slant or wedge surfaces 42 and 42' are provided which extend in the direction of key bars 11 and are inclined in the direction of displacement thereof. Key bars 11 are provided with associated slant or wedge surfaces 45 and 45' which are formed by the respective wall surfaces of a slot or recess 44 machined in the bar. Upon an axial displacement of control member 21, slant surfaces 42, 42' and 45, 45' apply against each other, so that key bars 11 are displaced in slots 12 and master jaws 3, engaged therewith, are radially displaced in slots 5.

Pressurized fluid is supplied to the pressure space 39 of chucking cylinder 27 from a fluid supply line 31 through a rotary distributor 30 which is mounted on the piston rod 29 of the fluid-actuated piston 28. There is also provided, on piston rod 28, a cam 32 cooperating with a limit switch 33 in order to limit the operational stroke A of piston 28, which stroke corresponds to the chucking zone. That is, as soon as contact 34 of limit switch 33 is opened by cam 32, a solenoid valve 36, mounted in the fluid supply line 31, is closed through a line 35, so that the supply of fluid is interrupted and no further displacement of the piston, beyond the limit of operational stroke A, takes place.

However, in order to have the possibility of bringing control member 21 into an end position in which splined strips 14 are disengaged from teeth 8 of master jaws 3, i.e., teeth 8 are opposite recesses 15, and jaws 3 can be unlatched, a switch 38 is provided in a bypass line 37, which, for example, can be operated manually. Upon actuating switch 38, open contact 34 is bridged and solenoid valve 36 is opened, so that, in such a case, the fluid supplied thereto moves piston 28 beyond the limit of operational stroke A, through a distance Z, up to the end position. In this position, key bars 11 are displaced to an extent such that their splined strips 14 are disengaged from teeth 8 of master jaws 3 and the jaws can be removed from chuck 2.

The axial displacement of piston 28, and of control member 21 firmly connected thereto, is transmitted to key bars 11 by slant or wedge surfaces 42 and 42' provided on the control member and by slant or wedge surfaces 45 and 45' in bars 11 cooperating therewith. It is possible, of course, to provide only one such surface on either side. Since key bars 11, by means of splined strips 14, are in gear with master jaws 3, clamping jaws 4 are moved toward or away from the workpiece, depending on the direction of displacement of piston 28. During the axial motion, control member 21 is guided in chuck body 2 non-rotatably, due to the extensions 41 engaging recesses 43, so that the forces produced are securely absorbed.

As explained, the chucking forces, and also the displacement, are transmitted always through two cooperating splines or teeth sets. By choosing an appropriate slope of slant surfaces 42 and 45, of the splines of strips 14 and jaw teeth 8, not only can the applied force be increased, but also the chucking stroke of clamping jaws 4 can be varied relative to the displacement of control member 21, so that any operational requirement can be met. A key bar chuck is thereby provided in which the key bars 11 can be actuated in a simple manner by the axially displaceable control member 21.

Figure 4:
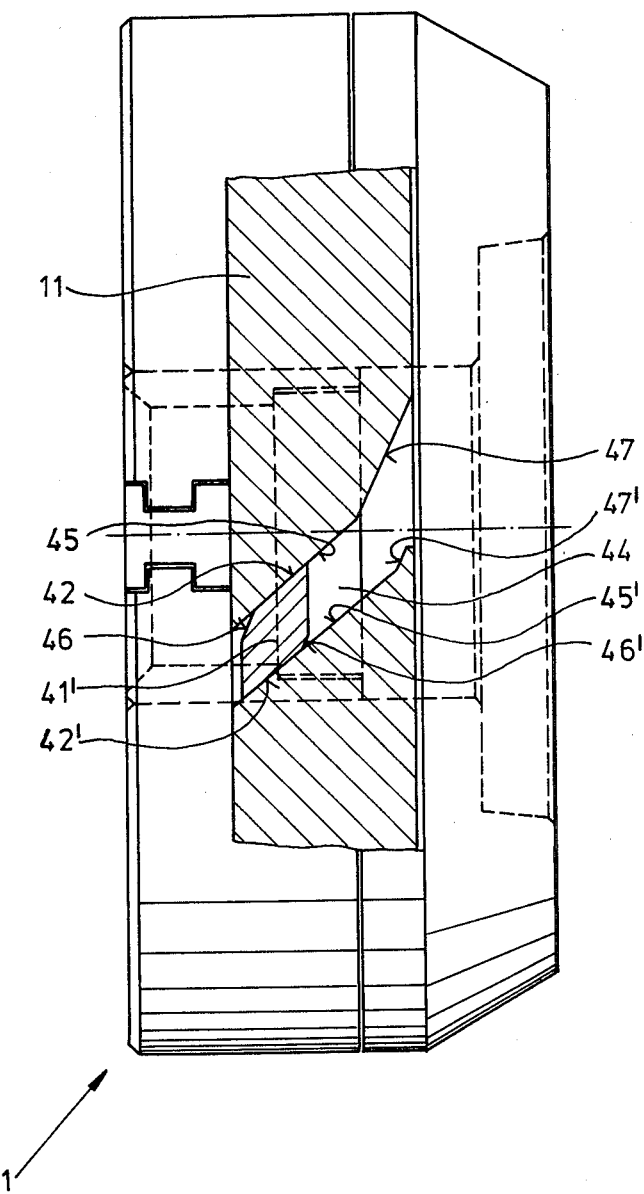
FIG. 4 is a view, similar to FIG. 3, illustrating another embodiment of the sloping or oblique surfaces provided on the key bars and on the control member.

As shown in FIG. 4, the slots 44, machined in key bars 11 for receiving the end portions 41' of extensions 41 provided with slant surfaces 42 and 42', may also be shaped so as to comprise two unequal slopes. Thereby, additional slant surfaces 47 and 47' are produced which effect a rapid stroke permitting a quick disengagement of bars 11 from teeth 8 of jaws 3. Corresponding surfaces 46, 46', cooperating with surfaces 47, 47' for producing the rapid stroke, are provided on the end portion 41' of each extension 41.

Figure 5:
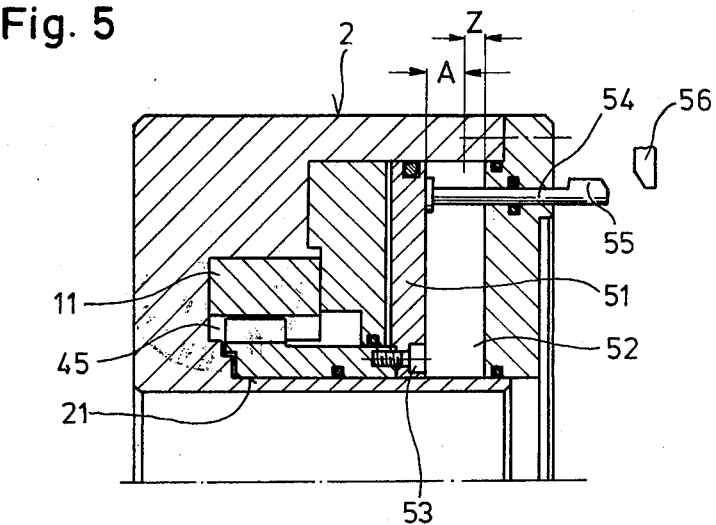
FIG. 5 is a radial sectional view of the chuck shown in FIG. 1 but having an actuating piston mounted directly in the chuck body.

In the embodiment of FIG. 5, the actuating member associated with control member 21 is again designed as a pressure-fluid operated piston 51. However, the piston is mounted, in the manner of a collet chuck, for reciprocation directly in recess 52 of chuck body 2. By means of screws 53, piston 51 is firmly connected to control member 21. For limiting the operational range of control member 21, a cam 55 is provided on a rod 54 carried by piston 51 and extending through chuck body 2, and cooperates with a limit switch 56.

Figure 6:
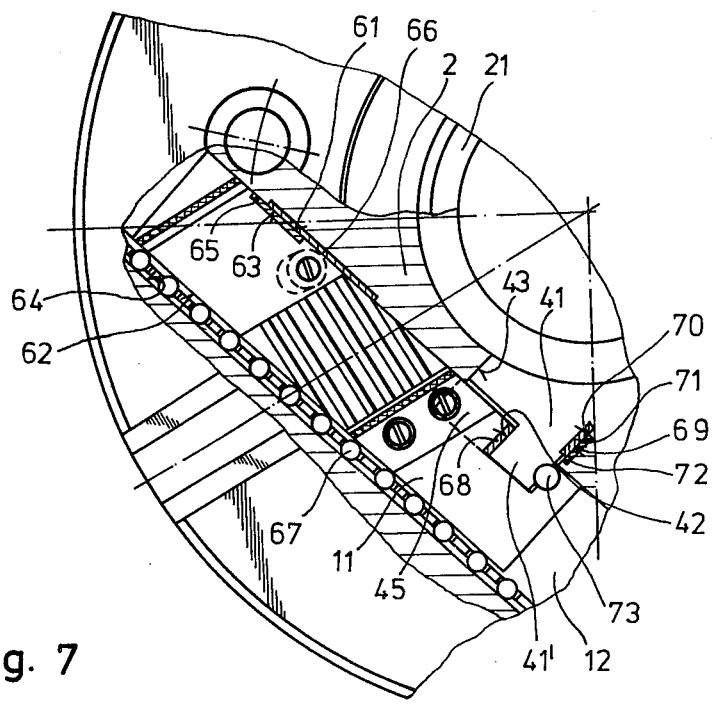
FIG. 6 is a view, similar to FIG. 2, illustrating various embodiments of the mounting of a key bar and of the control member.

FIG. 6 illustrates in what manner the friction of the surfaces of chuck body 2, key bar 11, and control member 21, applying against each other, can be reduced. For example, slide linings 65 and/or 66 may be provided on lateral surfaces 61 and 62 of key bars 11 or on lateral surfaces 63 and 64 of slots 12 receiving bars 11 and machined in chuck body 2. It is also possible, however, to provide a linear roller or ball bearing 67 between the respective surfaces. Further, slant surface 42 of extension 41 and/or slant surface 45 of key bar slot 44 may be provided with a slide lining 68, or an antifriction bearing 73 may be provided therebetween. Slide linings 71 and/or 72 may also be provided on the contacting surfaces 69 and 70 of control member 21 or on both sides of recesses 43 of chuck body 2.

Figure 7:
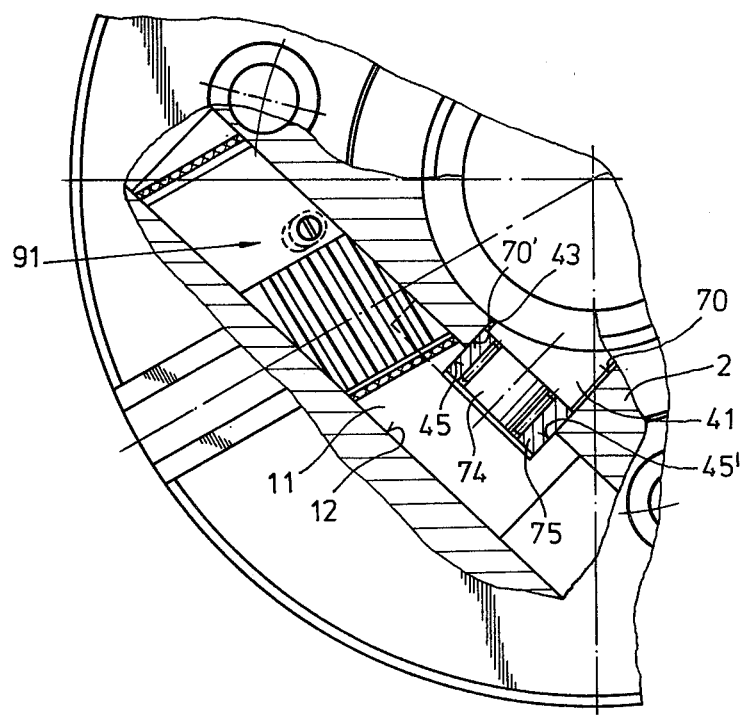
FIG. 7 is a view, similar to FIG. 2, illustrating an antifriction bearing mounted on the control member and bearing against the sloping surfaces of the control member and of a key bar.

As shown in FIG. 7, the outer portions of extensions 41 may also be designed as a stud 74 carrying an antifriction bearing 75. In such a case, bearing 75 is preferably mounted so that it contacts not only slant surfaces 45, 45' of key bar 11 but also lateral surfaces 70, 70' of recess 43. Thereby, the displacement of control member 21 is transmitted, and the forces absorbed, through a rolling motion.

Figure 8:
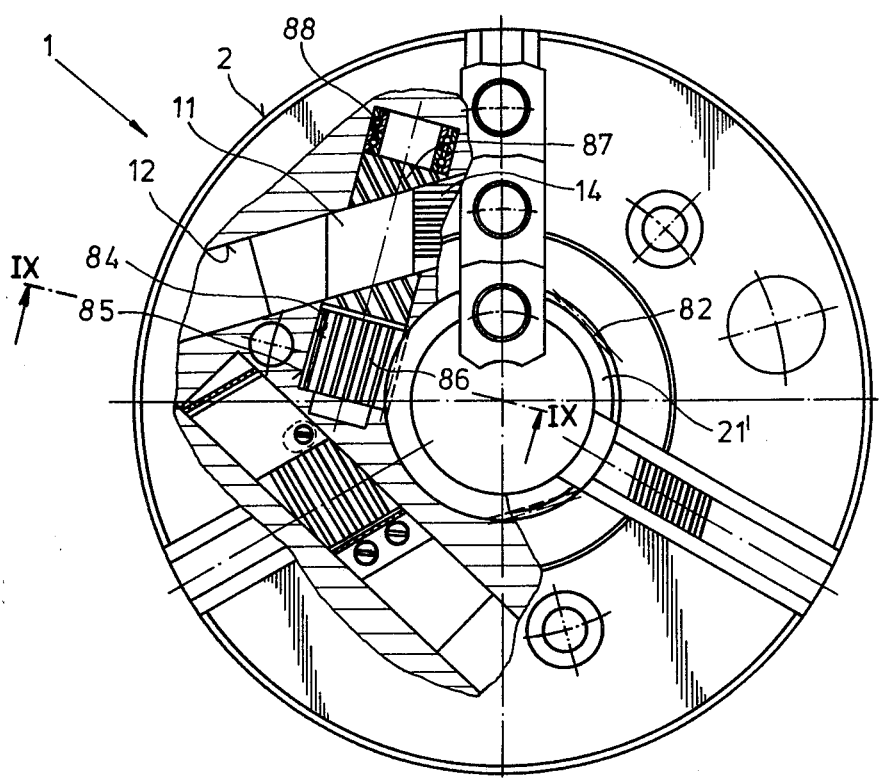
FIG. 8 is a front view, partly in section, of another embodiment of the chuck shown in FIG. 1 and in which gears are provided as intermediate members between the control member and the key bars.
Figure 9:
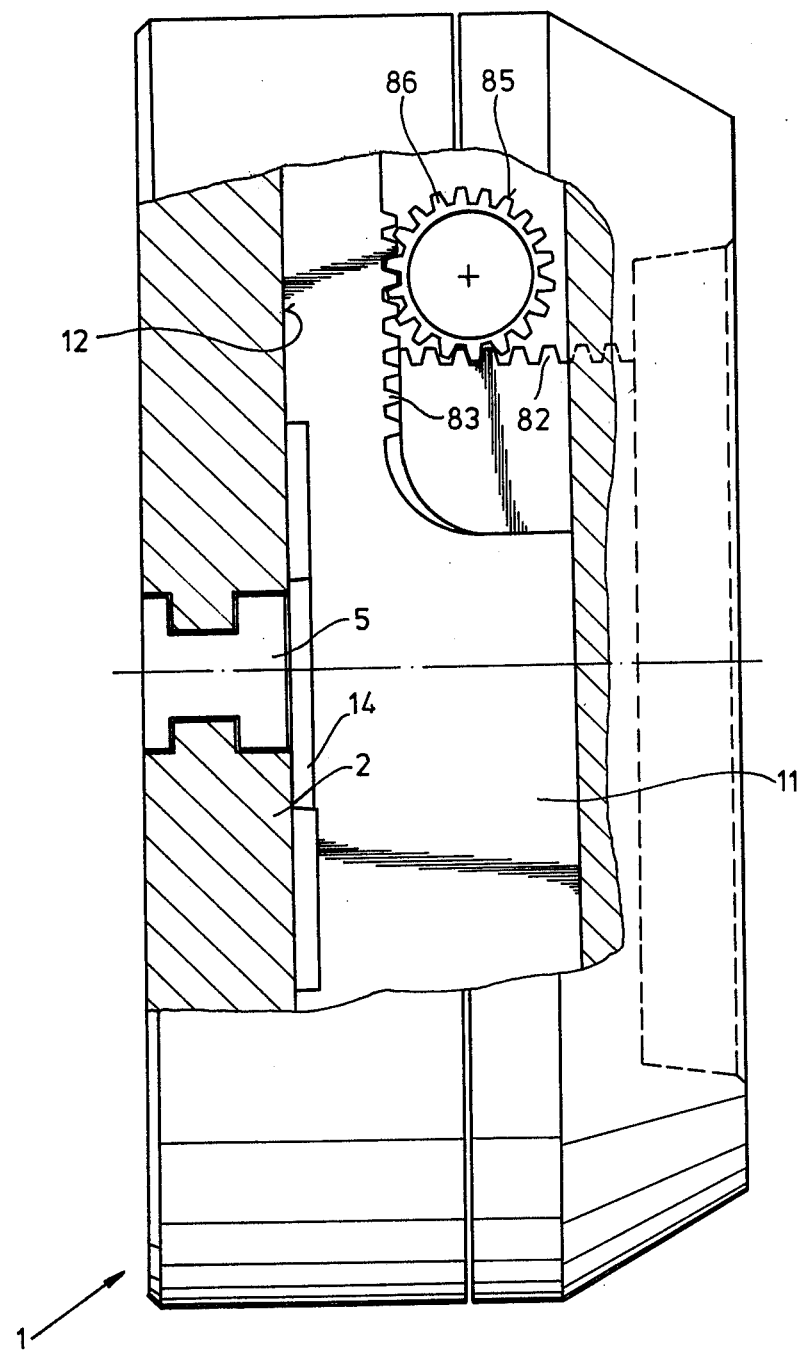
FIG. 9 is a top plan view, partly in section, of the chuck shown in FIG. 8.

In the embodiment shown in FIGS. 8 and 9, the axially displaceable control member 21' is operationally connected to key bars 11 through a gear 85 acting as an intermediate member. For this purpose, teeth 82 are provided on control member 21' and key bars 11 are also provided with teeth 83, and gear 85 engages both. Gear 85 is mounted for rotation in a recess 84 of chuck body 2, by means of antifriction bearings 88, and comprises a portion with straight teeth 86 meshing with teeth 82 of control member 21' and a portion with helical teeth 87 meshing with teeth 83 of key bar 11. It is also possible, however, with appropriately chosen teeth, to use a gear 85 with a single system of teeth. Thus, a displacement of control member 21' is transformed, through gear 85 and key bars 11 operatively connected thereto, into a radial motion of clamping jaws 4.

Figure 10:
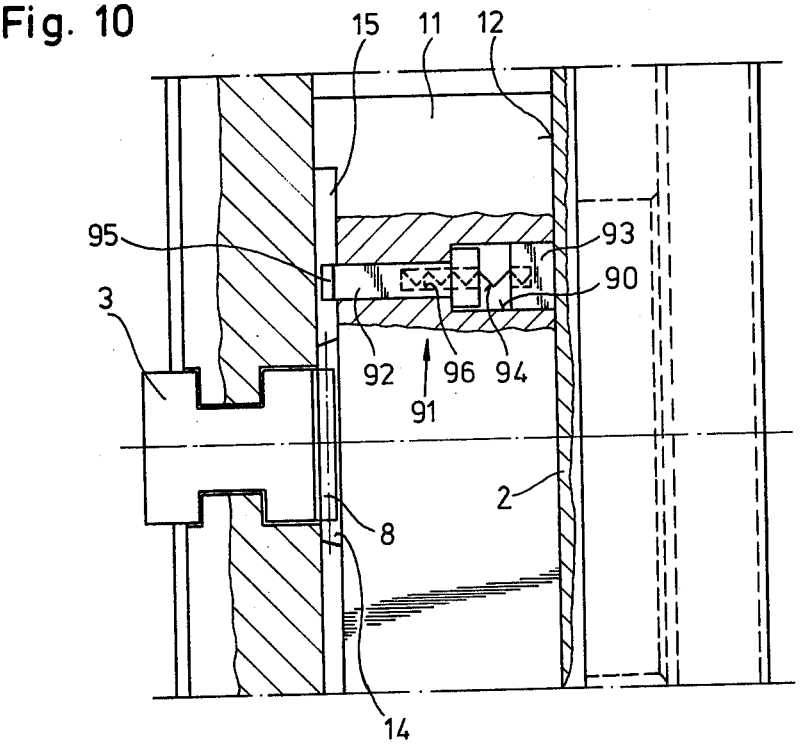
FIG. 10 is a sectional view illustrating a retaining member provided in the chuck shown according to FIG. 1.

In order to align and support master jaws 3 while they are inserted in slots 5, before they engage with splined strips 14 of key bars 11, a retaining member 91 is provided in the chuck, as shown in FIG. 10, which retaining member is inserted directly in key bar 11, into a hole 90 provided therein in the non-splined portion. Each retaining member 91 comprises an engaging piece 92 which is non-rotatably held in place and provided with beveled surfaces 95 extending in alignment with splined strip 14, a slide piece 93, and a compression spring 94 therebetween which is inserted in a recess 96 of engaging piece 92. Spring 94 bears against slide piece 93 which, in turn, applies against chuck body 2, so that due to the action of spring 94, piece 92 engages teeth 8 of master jaw 3, whereby, the jaw is held in place.

Figure 11:
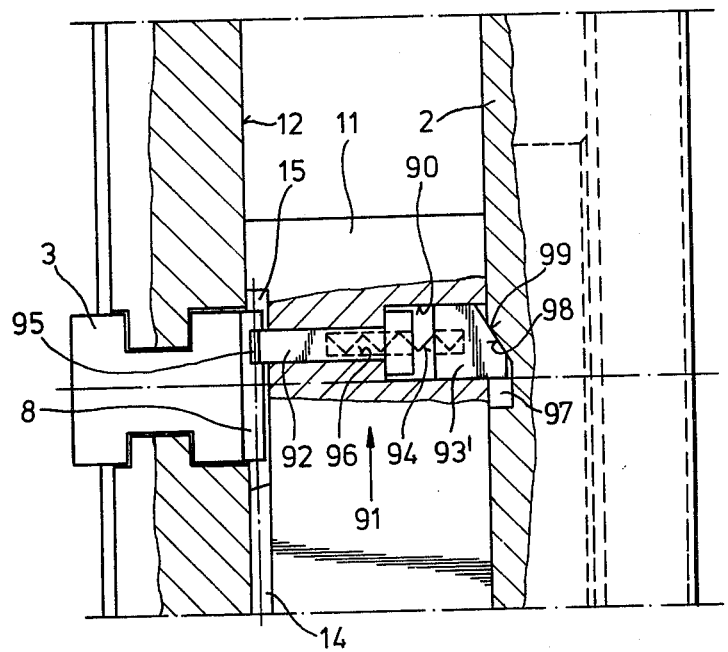
FIG. 11 is a view, similar to FIG. 10, but showing another form of the retaining member.

In order to reliably arrest even heavy jaws, in the embodiment shown in FIG. 11, a recess 97 is worked in chuck body 2 and provided with an oblique surface 98. A corresponding oblique surface 99 is provided on slide piece 93', which cooperates with surface 98. Upon a displacement of key bar 11, surface 99 slides up along surface 98, so that slide piece 93' is pushed deeper into hole 90 and butts against engaging piece 92. Thereby, engaging piece 92 is blocked and cannot be pushed back by a jaw.

While specific embodiments of the invention have been shown and described in detail to illustrate the application of the principles of the invention, it will be understood that the invention may be embodied otherwise without departing from such principles.

What is claimed is:

1. In a chuck, for turning machines, of the type including a chuck body, and radially displaceable jaws each movable by a key bar, guided in the chuck body tangential to the axis of turning, with each key bar having a splined strip meshing with teeth on the associated jaw and being displaceable to an extent such that, for removing the associated jaw, the splined strip attains a position in which it is disengaged from the teeth of the associated jaw, an improved key bar actuating mechanism comprising, in combination, a control member concentrically guided in said chuck body and axially displaceable in the latter through a key bar operating range and into end positions beyond said operating range; and mechanical means interconnecting said control member and said key bars, operable, responsive solely to axial displacement of said control member in said chuck body, to displace said key bars tangentially of the axis of turning to displace said jaws radially of said chuck body, and restraining rotation of said control member.

2. An improved key bar actuating mechanism, as claimed in claim 1, in which said mechanical means comprises wedge surfaces on said control member extending, in the direction of the key bars, obliquely to the direction of displacement of the key bars; and mating oblique surfaces on each key bar engageable with said wedge surfaces on said control member.

3. An improved key bar actuating mechanism, as claimed in claim 1, in which said mechanical means comprises actuating members on said control member; and respective oblique surfaces on each key bar extending longitudinally of the key bars and obliquely to the direction of displacement of the key bars, said oblique surfaces being engaged with said actuating members.

4. An improved key bar actuating mechanism, as claimed in claim 1, in which said mechanical means comprises respective sets of teeth on said control member extending in the direction of axial displacement thereof; respective sets of teeth on each key bar extending in the direction of displacement thereof; and an intermediate gear rotatable on the chuck body and meshing with the teeth on said control member and the teeth on said key bars.

5. An improved key bar actuating mechanism, as claimed in claim 1, in which said control member is a cylindrical member engaged in a cylindrical axial bore of said chuck body; said control member having extensions extending outwardly therefrom and tangentially of a base circle, through slots in said chuck body; said mechanical means on said control body being cooperable with cooperating means on said key bars provided on the radially outer portions of said extensions.

6. An improved key bar actuating mechanism, as claimed in claim 1, in which said cooperating means comprises sets of teeth on said control member extending in the direction of axial displacement thereof, respective sets of teeth on each key bar, and gears, forming intermediate members, mounted for rotation in recesses of said chuck body and having gear teeth engageable with the teeth on said control member and with the teeth on said key bars.

7. An improved key bar actuating mechanism, as claimed in claim 1, in which said control member is a cylindrical member axially displaceable in a cylindrical axial bore of said chuck body; and radial extensions on said control member engaged in cooperating recesses in said chuck body and securing said control member against rotation.

8. An improved key bar actuating mechanism, as claimed in claim 7, in which said mechanical means comprises wedge surfaces on the radially outer ends of said extensions; each key bar being formed with a slot extending longitudinally and obliquely of the direction of displacement of the associated key bar and having lateral surfaces cooperable with said wedge surfaces.

9. An improved key bar actuating mechanism, as claimed in claim 8, in which the slots in said key bar have longitudinally successive oblique surfaces inclined at different angles with respect to the direction of displacement of the associated key bar and corresponding to a clamping stroke and a rapid stroke, respectively; said extensions being provided with mating surfaces cooperating with the surfaces of said slots.

10. An improved key bar actuating mechanism, as claimed in claim 1, in which said control member is a cylindrical sleeve axially slidable in a cylindrical axial bore in said chuck body; a servo mechanism having, as an actuating member, a piston subject to movement by a fluid under pressure; and a tie rod connecting said piston to said control member.

11. An improved key bar actuating mechanism, as claimed in claim 1, including a pressure-fluid operated piston mounted for reciprocation in said chuck body; and means directly connecting said piston to said control member to serve as an actuating member for said control member.

12. An improved key bar actuating mechanism, as claimed in claim 1, in which said key bars are provided with seals on the surfaces thereof having said splined strips.

13. An improved key bar actuating mechanism, as claimed in claim 12, in which said seals are in the form of sealing strips extending parallel to guide slots, in said chuck body, receiving said jaws.

14. An improved key bar actuating mechanism, as claimed in claim 12, in which each key bar has a tooth-free recess adjacent an end of the associated splined strip; one of said seals being provided immediately adjacent said splined strip and the other seal being provided adjacent the tooth-free recess.

15. An improved key bar actuating mechanism, as claimed in claim 1, including slide linings covering guide surfaces of said key bars and cooperating contact surfaces, in the chuck body, for said key bars.

16. An improved key bar actuating mechanism, as claimed in claim 16, in which said slide linings are molybdenum linings.

17. An improved key bar actuating mechanism, as claimed in claim 1, including linear antifriction bearings provided between guide surfaces of each key bar and cooperating contact surfaces, in said chuck body, for said key bars.

18. An improved key bar actuating mechanism, as claimed in claim 1, including friction reducing means operatively associated with said cooperating means on said control body and on said key bars.

19. An improved key bar actuating mechanism, as claimed in claim 1, including friction reducing means interposed between said control member and the surface of said chuck body guiding said control member.

20. An improved key bar actuating mechanism, as claimed in claim 19, in which said control member is a cylindrical body engaged in an axial cylindrical bore in said chuck body; said control member being provided with radial extensions extending outwardly and tangentially of a base circle; said mechanical means including said extensions and oblique surfaces on said key bars; and antifriction bearings interposed between said extensions and said oblique surfaces.

21. An improved key bar actuating mechanism, as claimed in claim 20, in which said antifriction bearings bear partly against the oblique surfaces of said key bars and partly against respective contact surfaces of recesses, in the chuck body, associated with said control member.

22. An improved key bar actuating mechanism, as claimed in claim 1, in which said control member is a cylindrical body axially displaceable in a cylindrical axial bore of said chuck body; said control member being provided with extensions extending outwardly and tangentially of a base circle; said mechanical means including wedge surfaces on said extensions and further including antifriction bearings in said key bars cooperable with said wedge surfaces.

23. An improved key bar actuating mechanism, as claimed in claim 1, in which said splined strips of said key bars are so oriented that the teeth on the associated jaws are straight teeth extending perpendicular to the length of the jaws.

24. An improved key bar actuating mechanism, as claimed in claim 1, in which each key bar has a tooth-free zone adjacent one end of its associated splined strip; and respective jaw-retaining members positioned in said chuck body in said non-splined zones.

25. An improved key bar actuating mechanism, as claimed in claim 24, in which each retaining member includes a non-rotatable engaging piece guided in said chuck body and provided with bevelled surfaces for engaging the teeth of the associated jaw; a slide piece bearing against the chuck body in alignment with the engaging piece; and a compression spring inserted between each engaging piece and the associated slide piece.

26. An improved key bar actuating mechanism, as claimed in claim 25, in which each slide piece is operatively associated with a recess of the chuck body extending longitudinally of the retaining member, with each slide piece being formed with an oblique surface; said oblique surface cooperating with an oblique surface in said recess during latching of the associated jaw.

27. An improved key bar actuating mechanism, as claimed in claim 26, in which the space between each engaging piece and the associated slide piece is so dimensioned that, with the associated jaw latched, the engaging piece and the slide piece abut each other.

28. In a chuck, for turning machines, of the type including a chuck body, and radially displaceable jaws each movable by a key bar, guided in the chuck body tangential to the axis of turning, with each key bar having a splined strip meshing with teeth on the associated jaw and being displaceable to an extent such that, for removing the associated jaw, the splined strip attains a position in which it is disengaged from teeth of the associated jaw, an improved key bar actuating mechanism comprising, in combination, a control member concentrically guided in said chuck body and axially displaceable in the latter through a key bar operating range and into end positions beyond said operating range; mechanical means, interconnecting said control member and said key bars, operable, responsive solely to axial displacement of said control member in said chuck body, to displace said key bars tangentially of the axis of turning to displace said jaws radially of said chuck body, and restraining rotation of said control member; fluid-pressure actuating means operable to displace said control member; electric control circuit means for said fluid-pressure actuating means, said circuit means including a limit switch operable, responsive to displacement of said control member to a limit of said operating range, to deactivate said fluid-pressure actuating means; and a by-pass circuit, including a switch, connected in parallel with said limit switch; said last-named switch in said by-pass circuit being operable to activate said fluid-pressure actuating means to move said control member beyond said operating range.

* * * * *